United States Patent
Lu et al.

(10) Patent No.: US 9,899,915 B2
(45) Date of Patent: Feb. 20, 2018

(54) QUASI UNIVERSAL FEED FORWARD DC TO DC CONVERTER AND METHOD

(71) Applicant: National Taiwan Normal University, Taipei (TW)

(72) Inventors: Yi-Kuang Lu, Taipei (TW); Ton-Churo Huang, Taipei (TW)

(73) Assignee: National Taiwan Normal University, Taipei (TW)

( * ) Notice: Subject to any disclaimer, the term of this patent is extended or adjusted under 35 U.S.C. 154(b) by 0 days.

(21) Appl. No.: 15/384,893

(22) Filed: Dec. 20, 2016

(65) Prior Publication Data
US 2017/0179821 A1    Jun. 22, 2017

(30) Foreign Application Priority Data
Dec. 22, 2015    (TW) .............................. 104143131 A (51) Int. Cl.
| | |
|---|---|
| H02J 3/12 | (2006.01) |
| G05F 1/00 | (2006.01) |
| G05F 5/00 | (2006.01) |
| H02M 3/156 | (2006.01) |
| H02M 1/32 | (2007.01) |
| H02M 1/08 | (2006.01) |
| H02M 1/00 | (2006.01) |

(52) U.S. Cl.
CPC ............. *H02M 3/156* (2013.01); *H02M 1/08* (2013.01); *H02M 1/32* (2013.01); *H02M 2001/0009* (2013.01)

(58) Field of Classification Search
CPC ...... G05F 1/461; H02M 3/156; H02M 3/1563
USPC ....... 323/242, 243, 246, 274, 275, 285, 288, 323/300
See application file for complete search history.

(56) References Cited

U.S. PATENT DOCUMENTS

| | | | | |
|---|---|---|---|---|
| 6,088,243 | A * | 7/2000 | Shin ........................ | H02J 9/005 363/21.05 |
| 7,202,640 | B2 * | 4/2007 | Morita ................ | H02M 1/4225 323/205 |
| 2004/0196013 | A1 * | 10/2004 | Chen ...................... | H02M 3/156 323/282 |
| 2006/0176098 | A1 * | 8/2006 | Chen ...................... | H02M 3/156 327/341 |
| 2007/0252570 | A1 * | 11/2007 | Ritter .................... | H02M 3/156 323/288 |

* cited by examiner

*Primary Examiner* — Gary Nash
(74) *Attorney, Agent, or Firm* — Muncy, Geissler, Olds & Lowe, P.C.

(57) ABSTRACT

This invention proposes using a feed forward quasi universal converter for energy harvesters, and uses it to power IoTs (Internet of things). A typical DC to DC converter uses voltage feedback control or current feedback control. It is not easy for the input impedance to closely match the output impedance of the power source. In the meantime, it also meets its output voltage and power targets. The Feed forward Quasi Universal Converter proposed in this invention controls the input impedance and the output voltage/power within a range that meets the design targets. It is also achieved with a simple electronic adjustment when the source impedance changes or the output requirements change. It has the potential to shorten the IoTs system industry's product development cycle, reduce installation and maintenance costs and facilitate the adoption of hybrid energy sources.

11 Claims, 5 Drawing Sheets

QUASI UNIVERSAL FEED FORWARD DC TO DC CONVERTER AND METHOD

CROSS-REFERENCE TO RELATED APPLICATION

This application claims priority from Taiwan Patent Application No. 104143131, filed on Dec. 22, 2015, in the Taiwan Intellectual Property Office, the content of which are hereby incorporated by reference in their entirety for all purposes.

BACKGROUND OF THE INVENTION

1. Field of the Invention

The present invention relates to a feed forward converter and method, more particularly to a feed forward converter and method that control the input impedance, output voltage and power of the DC/DC converter within a predetermined range.

2. Description of the Related Art

In the near future, in comparison with necessary energy harvester for IoTs power supply, replacing with battery or increasing AC power on objects connected to IoTs is relatively costly. Currently DC-to-DC converters are generally designed with voltage feedback control, or current feedback control. For these DC-to-DC converters, it is not easy for their input impedance to closely match that of several different types of energy harvesters (or to closely match the impedance of an energy harvester while environmental change is made), while the output power and the output voltage is obtained within the desired target range.

DC-to-DC converters are structurally complex, relatively costly, and relatively difficult for them to match the impedance for several different types of energy harvesters closely while also meeting the output voltage and output power requirements within the target range. Therefore, generally, the current practice is to satisfy the output voltage requirements, or to satisfy the specific requirements of the energy harvester in a particular environment.

SUMMARY OF THE INVENTION

To solve the aforementioned limitations of the prior art, the present invention provides a quasi universal feed forward DC-to-DC power converter to control the input impedance, the output power, and the output voltage of a DC-DC converter locates between the power source (which may be a current source or a voltage source) and a load. The quasi universal feed forward DC-to-DC power converter includes an inductor, a switching element, an input voltage or current detector, a sawtooth generator circuit, a comparator circuit and a controlling circuit. The following is to describe the structure of one type of the Quasi universal converter based on the boost converter. The inductor is coupled between the power source and the load. The switching element is coupled to the inductor for controlling energy transmission and storage of the inductor. The sawtooth generator circuit modulates an input voltage of the power source input to an input thereof and outputs a reference voltage in a sawtooth waveform with a fixed period. The comparator circuit has a first input terminal coupled to the junction point of two variable resistors, a second input terminal coupled to an output terminal of the sawtooth wave generator circuit, and an output terminal coupled to a control terminal of the switch element. Wherein, the first input terminal is further connected to ground through one of the variable resistor and receives a voltage division of the input voltage, the second input terminal receives the reference voltage, and when the voltage division of the input voltage is less than a peak value of the reference voltage, a switch controlling signal is generated to turn on the switching element. A control circuit is coupled to another input terminal of the sawtooth wave generator circuit, the first variable resistor, and the second variable resistor, respectively. The control circuit is configured to vary resistance values of the first and second variable resistors or the peak voltage of the sawtooth waveform based upon the measured converter input voltage, a known characteristic of the power source output impedance, the minimum converter output power and the output voltage range requirements. Consequently, it controls the duty cycle of the converter switch such that the input impedance of the converter matches the output impedance of the power source as close as possible. In the meantime, it also makes the output power output to the load exceeds the target output power, and the output voltage output to the load falls within the target output voltage range.

Preferably, the quasi universal feed forward control DC-DC power converter may further include a diode coupled to the switching element and the inductor. When the switching element and the diode are connected between the inductor and the power source, the quasi universal feed forward control DC-DC power converter is in Buck operation mode, and when the switching element and the diode are connected between the inductor and the load, the quasi universal feed forward control DC-DC power converter is in Boost operation mode. This is also applicable in a buck-boost DC-to-DC conversion architecture.

Preferably, when an inductance value of the inductor is higher or lower than a threshold inductance value, the feed forward control power converter may operate in continuous mode (CCM) or discontinuous mode (DCM).

Preferably, the control circuit may further calculate the target output voltage range based upon the target output power, and is configured to control the resistance values of the first and the second variable resistors, and control the peak value of the sawtooth waveform of the reference voltage based upon the input voltage of the power source and the target output voltage range, such that the output voltage output to the load falls within the target output voltage range.

Preferably, when the division voltage of the input voltage is greater than the peak value of the sawtooth waveform of the reference voltage, the comparator circuit may be configured to turn off the switching element for over voltage protection.

Another aspect of the present invention is to provide a quasi universal feed forward control DC-DC power converting method applicable to control an input impedance, an output power, and an output voltage between a power source and a load, and is applicable to the quasi universal feed forward control DC-DC power converter mentioned above, the method comprising the following steps: inputting an input voltage to an inductor from a power source; modulating the input voltage input from the power source by the sawtooth wave generator circuit and outputting a reference voltage in sawtooth waveform with a fixed period; receiving a voltage division of the input voltage by the first input terminal of the comparator circuit, and receiving the reference voltage by the second input terminal of the comparator circuit, wherein when the voltage division of the input voltage is less than a peak value of the reference voltage and greater than the reference voltage, a switch controlling signal is generated to turn on the switching element and adjust the duty cycle of the converter; such that the input impedance of the converter matches the output impedance of the power source as close as possible. In the meantime, the output power output to the load exceeds the target output power and the output voltage output to the load falls within the target output voltage range.

Preferably, the feed forward controlling power method may further include coupling a diode to the switch element and the inductor, when the switching element and the diode are connected between the inductor and the power source, the quasi universal feed forward control DC-DC power converter is in Buck operation mode, and when the switching element and the diode are connected between the inductor and the load, the quasi universal feed forward control DC-DC power converter is in Boost operation mode Preferably, when an inductance value of the inductor is higher or lower than a threshold inductance value, the feed forward control power converter may operate in continuous mode (CCM) or discontinuous mode (DCM).

Preferably, the feed forward control method may further include configuring the control circuit to calculate the target output voltage range based upon the target output power, and to control the resistance values of the first and the second variable resistors and the peak value of the sawtooth waveform of the reference voltage based upon the input voltage and the target output voltage range, such that the output voltage output to the load falls within the target output voltage range.

Preferably, when the division voltage of the input voltage is smaller than the reference voltage (peak values of the sawtooth waveform), the comparator circuit may be configured to turn off the switching element for over voltage protection.

In summary, the feed forward control power converter of this invention is combined with feed forward control circuits and a DC-DC converter, no required for voltage and current feedback control, therefore the structures are simple and has lower cost. By way of the aforementioned framework, the feed forward control is designed to convert the input voltage into the sawtooth waveform with the fixed period, and then to be combined with the design of DC-DC converter circuit, such that the input impedance of DC-DC converter, the output voltage and the output power are able to be controlled within certain ranges. When the input impedance of the voltage source or current source varies, or the output voltage requirement and the output power requirement varies, the present system is designed to meet these requirements by adjusting the peak value of the sawtooth waveform with fixed period or the variable resistor coupled to the comparator circuit to adjust the duty cycle of the converter.

DETAILED DESCRIPTION OF THE PREFERRED EMBODIMENTS

To illustrate and explain the novel features, contents, and advantages of the present invention, and the effect that can be achieved therefrom; detailed descriptions of the preferred embodiments of the present invention are herein provided, and these reference the accompanying diagrams. It should be noted, however, that the diagrams and exemplary embodiments herein used, are for the purpose of illustrating and explaining the specification of the present invention, without necessarily implying the actual size, ratio, or precise configuration. Therefore, in the accompanying diagrams, the size, ratio and configuration shall not be interpreted in any way that limits the scope, applicability or configuration of the present invention.

Available herein, the term "And/Or" containing any or all combinations of one or multiple related listed items. When "At least one of" description prefixes one component list, the whole listed component rather than individual component in a list is modified.

Figure 1:
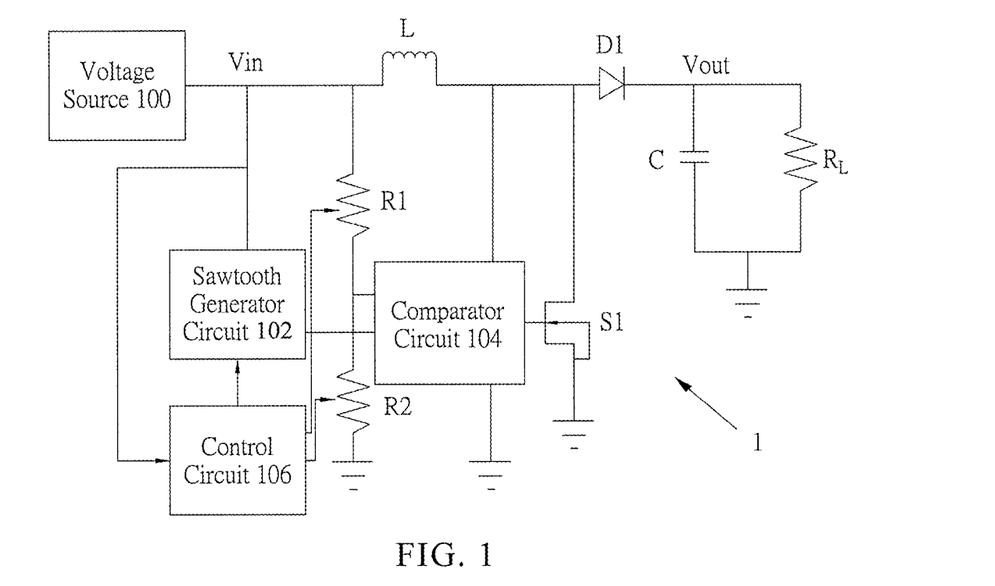
FIG. 1 illustrates a circuit diagram according to an embodiment of the quasi universal feed forward control power converter of the present invention.

Embodiments of the quasi universal feed forward control power converter of the present invention are described in accordance with the accompany drawings hereinafter. Please refer to FIG. 1, which illustrates a circuit diagram according to an embodiment of the quasi universal feed forward control power converter of the present invention. As shown in FIG. 1, the quasi universal feed forward DC-DC power converter 1 applicable to control an output voltage Vout output to a load $R_L$ between an voltage source (or current source) 100 and the load $R_L$, and the quasi the universal feed forward DC-DC power converter includes an inductor L, a switching element S1, a sawtooth wave generator circuit 102, a comparator circuit 104 and a control circuit 106. The inductor L is coupled between the voltage source 100 and the load $R_L$, and the switch element S1 is coupled to the inductor L for controlling the energy transmission and storage of the inductor L.

The sawtooth wave generator circuit 102 modulates the input voltage Vin input by the voltage source 100 to output a reference voltage $V_{REF}$ in a sawtooth waveform with a fixed period T. The comparator circuit 104 has a first input terminal coupled to first variable resistor R1, a second input terminal coupled to the sawtooth waveform generator 102 that generated reference voltage $V_{REF}$ and an output terminal coupled to a control terminal of the switching element S1. A voltage of the second input terminal of the comparator circuit 104 is in the sawtooth waveform with a fixed period, a voltage of the first input terminal is the voltage Vin*(R1/(R1+R2)) resulted from the voltage division of the input voltage Vin. When the division voltage Vin*(R1/(R1+R2))

of the input voltage is less than the peak value Vp of the reference voltage and greater than the reference voltage $V_{REF}$, a switch controlling signal is produced to turn on the switching element S1. The control circuit 106 is coupled to the sawtooth wave generator circuit 102, a first variable resistor R1 and a second variable resistor R2, respectively. Based upon the input voltage Vin, a target output power and a target output voltage, the control circuit 106 is configured to control each of the resistance values of the first variable resistor R1 and the second variable resistor R2, and the peak value of the sawtooth waveform with the fixed period to control a duty cycle D of the switch, such that an output power Pout output to the load $R_L$ is controlled to exceed the target output power (i.e., the input impedance of the converter is as close to the output impedance of the energy source as possible), and the output voltage is controlled to fall within a target range.

In particular, the feed forward control power converter of the present invention is combined with feed forward control circuits and a DC-DC converter, no requirement for voltage and current feedback control, therefore the structures are simple and has lower cost. By way of the aforementioned framework, the feed forward control is designed to convert the input voltage into sawtooth waveform with the fixed period, and then to be combined with the design of DC-DC converter circuit, such that the input impedance of DC-DC converter, the output voltage Vout and the output power Pout are able to be controlled within certain ranges. When the input impedance of the voltage source or current source varies, or the output voltage requirement and the output power requirement varies, the present system is designed to meet these requirements by adjusting the peak value of the sawtooth waveform with fixed period and the variable resistor coupled to the comparator circuit to modulate the duty cycle D. The specific circuit diagram and operation flow chart of the feed forward control power converter of the present invention is further illustrated with reference to FIG. 2.

Figure 2:
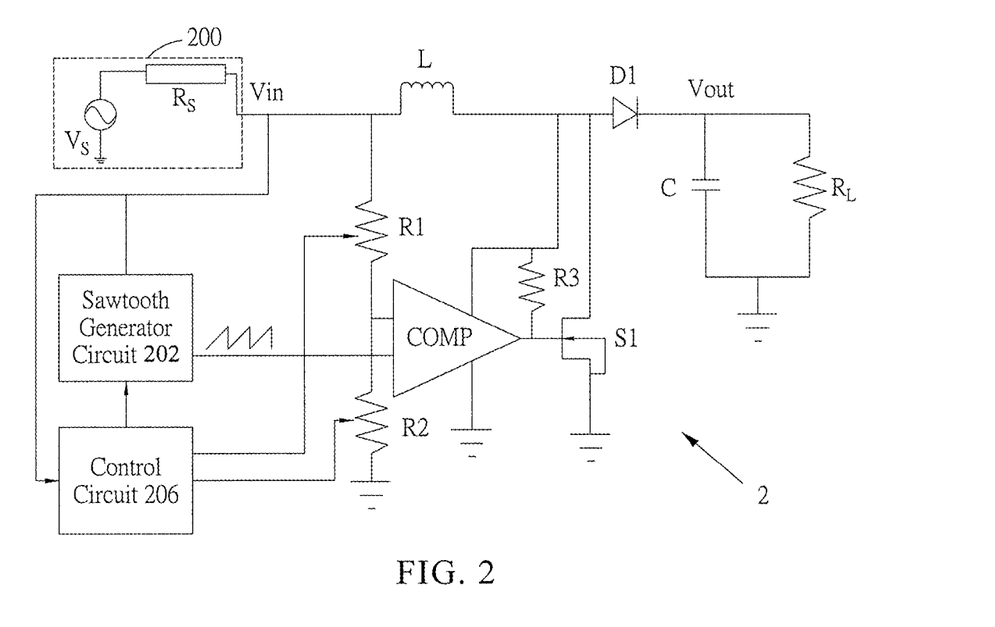
FIG. 2 illustrates a circuit diagram based upon an embodiment of the feed forward control power converter of the present invention.

With reference to FIG. 2, which illustrates a circuit diagram based upon an embodiment of the feed forward control power converter of the present invention. Each component in this embodiment is substantially similar to the previous embodiment, therefore the repeated details will be omitted hereinafter. As shown in FIGS. 1 and 2, the difference is that the voltage source 100 is replaced with the AC/DC voltage source or current source Vs served as a voltage source 200, the comparator circuit 104 is replaced with a comparator COMP. The present embodiment is exemplarily illustrated with a boost power converter as the same as the previous embodiment. Note that the configuration of the connection between a diode D1, the switching element S1 and the inductor L may be changed. When the switching element S1 and the diode D1 are connected between the inductor L and the voltage source Vs, the feed forward control power converter 2 is in Buck operation mode. When the switching element S1 and the diode D1 are connected between the inductor L and the load $R_L$, the feed forward control power converter is in Boost operation mode. The operation flow for the Boost operation mode and Buck operation mode would be familiar to those skilled in the art, therefore the descriptions thereof are omitted herein.

Moreover, the inductance value of the inductor L may be optionally greater or less than the threshold inductance value, and the feed forward control power converter may separately operate between Continuous Mode (CCM) or Discontinuous Mode (DCM). The techniques mentioned above are also familiar to those skilled in the art, therefore the relevant descriptions are omitted herein since they are not crucial to the present invention.

Figure 3:
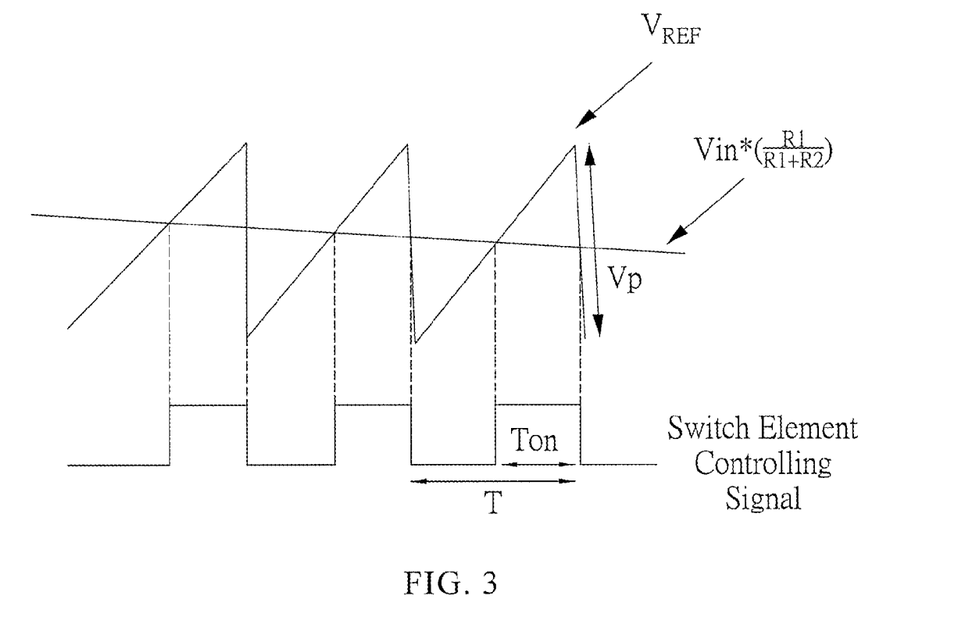
FIG. 3 illustrates the timing diagram of the division voltage of the input voltage, the reference voltage, and the switch controlling signal in accordance with the embodiment of the feed forward control power converter of the present invention.

As illustrated, the comparator COMP is disposed in the Boost power converter. The voltage in sawtooth waveform with fixed period are input to the positive input terminal of the comparator COMP, and a division voltage Vin*(R1/(R1+R2)) resulted from voltage division of the input voltage Vin is input to the negative input terminal of the comparator COMP. With reference to FIG. 3, which illustrates the timing diagram of the division voltage of the input voltage, the reference voltage, and the switch controlling signal in accordance with the embodiment of the feed forward control power converter of the present invention. When the peak value Vp of the sawtooth waveform is greater than the division voltage Vin*(R1/(R1+R2)), the switch controlling signal is output to turn on the switching element S1 (i.e., turned-on time Ton as illustrated in FIG. 3), otherwise the switching element S1 is turned off. Therefore, when the input voltage Vin increases, the turned-on time Ton will decrease; and when the input voltage Vin decreases, the turned-on time Ton increases.

In principle, the turned-on time Ton divided by the fixed period T is equal to the duty cycle D, and the relationship between the duty cycle D, the input voltage Vin, the first variable resistor and the second variable resistor are described by the following Equation (1):

$$Vp*(1D)=Vin* (R1/(R1+R2)) \tag{1}$$

Where Vp, R1 and R2 may vary, the control circuit 206 can dynamically adjust Vp, R1 and R2 to change the duty cycle D. When the voltage resistance varies, or the requirements of the output voltage Vout and the output power Pout vary, the control circuit 206 dynamically controls the D value, such that the input impedance of the DC-DC converter, the output voltage and the output power of the DC-DC converter are within a predetermined range that satisfies the requirements. In more detail, the input impedance and the output voltage of a Boost DC-DC converter under DCM are represented in the following equations (2) and (3):

$$\langle Rin \rangle = \frac{Vin}{\langle Iin \rangle} = \left( \frac{\sqrt{1+4D^2/K} - 1}{\sqrt{1+4D^2/K} + 1} \right) \times \frac{2f_s L}{D^2} \tag{2}$$

$$Vout = \left(1 + \sqrt{1+4D^2/K}\right) Vp(1-D) \times \frac{\eta+1}{2} \tag{3}$$

where $\eta = \frac{R2}{R1}$ and $K = \frac{2f_s L}{R_L}$, $V_p$ represents the peak value voltage of the sawtooth waveform $f_s$, represents the operation frequency of the converter, L represents the inductance value of the converter, and $K<D(1-D)^2$. $V_{in}$ represents the input voltage of converter.

Figure 4:
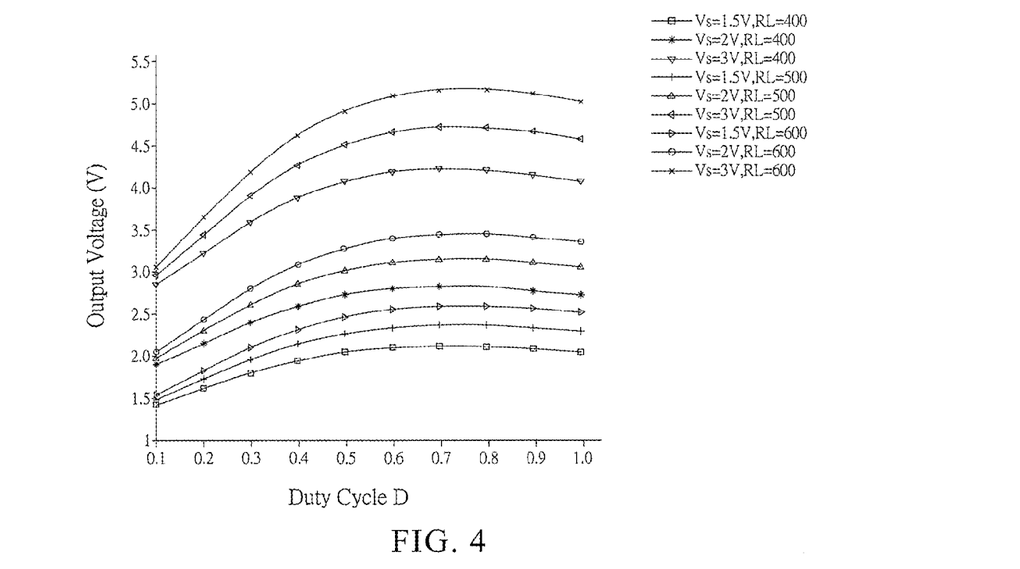
FIG. 4 illustrates a curve diagram of the output voltage of the power convertor against the period according to the embodiment of the feed forward control power converter of the present invention.
Figure 5:
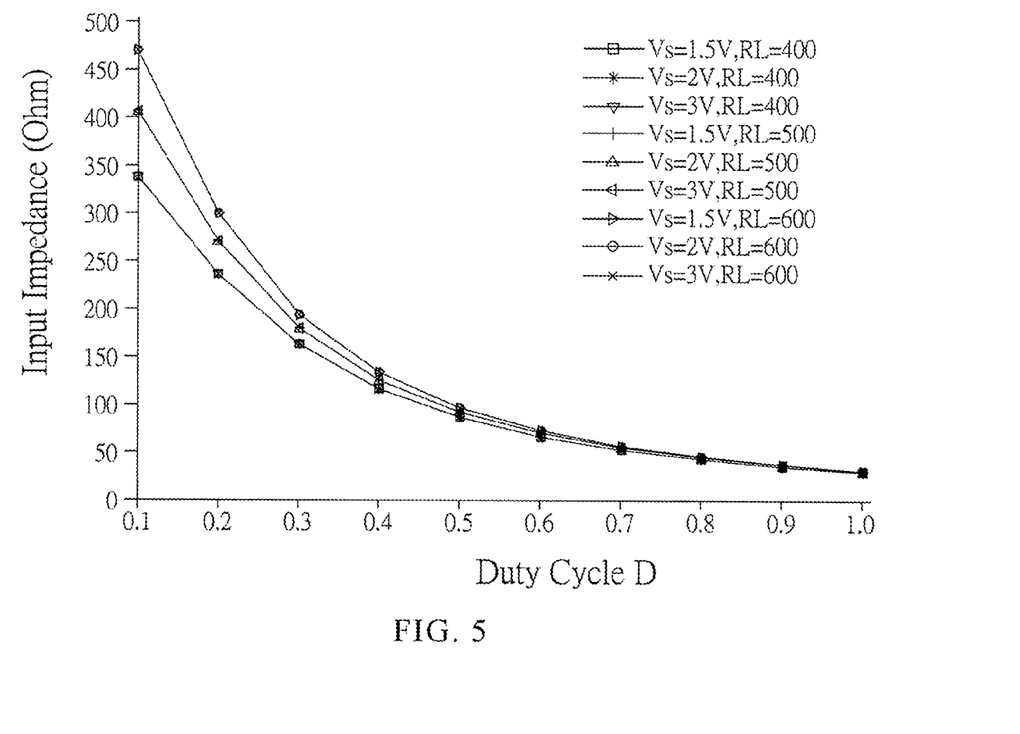
FIG. 5 illustrates a curve diagram of the input impedance of the power convertor against the period according to the embodiment of the feed forward control power converter of the present invention.
Figure 6:
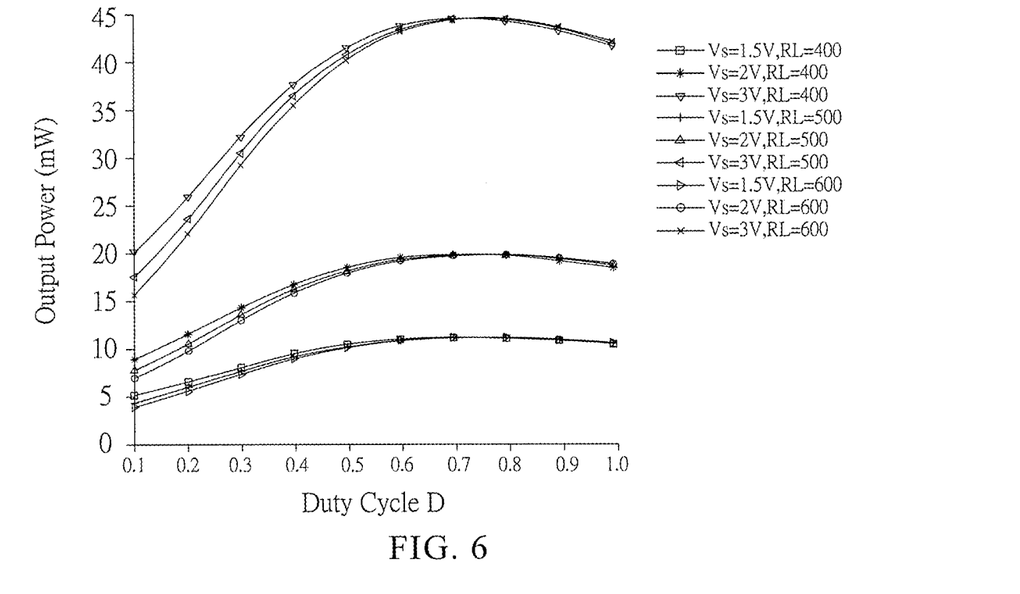
FIG. 6 illustrates the curve diagram of the output power of the power convertor against the period according to the embodiment of the feed forward control power converter of the present invention.

The known condition is substituted into equations (2) and (3) to obtain the relationship between the output voltage Vout and the duty cycle D, the relationship between the input impedance Rin and the duty cycle D, and the relationship between the output power Pout and D value, and relationship diagrams are illustrated in FIGS. 4-6. FIG. 4 illustrates a curve diagram of the output voltage of the power convertor against the duty cycle according to the embodiment of the feed forward control power converter of the present invention, FIG. 5 illustrates a curve diagram of the input impedance of the power convertor against the duty cycle according to the embodiment of the feed forward control power converter of the present invention, and FIG. 6 illustrates the curve diagram of the output power of the power convertor against the duty cycle according to the embodiment of the feed forward control power converter of the present invention. In order to satisfy the condition that the Boost power convertor operates under DCM, $D(1-D)^2 > K$ is required, therefore D<0.5.

Example 1 assuming that the voltage Vs generated by the power source (the energy harvester) ranges between 1.5V and 3V, cases such as Vs=3V, 2V, 1.5 V are illustrated as examples herein. The output resistance Rs of the voltage source is 50 ohms, the load $R_L$ is 500 ohms. The the output voltage Vout of the DC-DC converter is required to range between 2V to 3V, the minimum output power is 10 mW. Firstly, $f_s L=20$ (that is $f_s$=200 k, L=100μ) is selected to be suitably operated, and is substituted into the above equations (2) (3) to acquire a D value that meets requirements. Table 1 below shows a range of the D value that meets the output requirement, and the corresponding input resistance Rin, output power Pload, converter input voltage Vin and output voltage Vout for a selected D value that is in the range. Referring to the first row of table 1 below, when Vs=1.5V, the D value meets requirements ranges between 0.48 and 0.56. Choosing D=0.5 results in Rin=91 ohm, Vin=0.97V, Vout=2.27V and Pload=10.3 mW. The chosen parameters allow the input resistance Rin to be as close to Rs as possible, in the meantime, it also meets the output requirements.

TABLE 1

| Vs (V) | Rin (Ω) | Vin (V) | Vout (V) | Pload (mW) | D Value Being Met Requirements | D Value Being Selected |
|---|---|---|---|---|---|---|
| 1.5 | 91 | 0.97 | 2.27 | 10.3 | 0.48 < D < 0.56 | 0.5 |
| 2 | 125 | 1.43 | 2.86 | 16.3 | 0.18 < D < 0.47 | 0.4 |
| 3 | 404 | 2.67 | 2.97 | 17.6 | D = 0.1 | 0.1 |

Example 2 assuming that the voltage Vs generated by the power source (energy harvester) ranges between 1.5V and 3V, cases such as Vs=3V, 2V, 1.5 V are illustrated as examples herein. The output resistance Rs of the voltage source is 50 ohms, the load $R_L$ is 400 ohms. The output voltage Vout is required to range between 2V to 3V, the minimum output power is 10 mW. Firstly, $f_s L=20$ (that is $f_s$=200 k, L=100μ) is selected to be suitably operated, and is substituted into the above equations (2) (3) to acquire a D value that meets requirements. Table 2 below shows a range of the D value that meets the output requirement, and the corresponding input resistance Rin, output power Pload, converter input voltage Vin and output voltage Vout for a selected D value that is in the range. Referring to the first row of table 2, for Vs=1.5V, the working range of D is between 0.46 and 0.5. Choosing D=0.49 results in Rin=88 ohm, Vin=0.96 V, Vout=2.04 V and Pload=10.4 mW. The chosen parameters allows Rin to be as close to Rs as possible, in the mean time, it also meets the output requirements.

TABLE 2

| Vs (V) | Rin (Ω) | Vin (V) | Vout (V) | Pload (mW) | D Value Being Met Requirements | D Value Being Selected |
|---|---|---|---|---|---|---|
| 1.5 | 88 | 0.96 | 2.04 | 10.4 | 0.46 < D < 0.5 | 0.49 |
| 2 | 88 | 1.28 | 2.72 | 2.72 | 0.15 < D < 0.58 | 0.49 |
| 3 | 293 | 2.56 | 2.99 | 2.99 | 0.135 < D < 0.14 | 0.14 |

Example 3

As illustrated in the equation (1) Vp(1−D)=Vin*(R1/(R1+R2)) of the present embodiment, when the peak value Vp of the sawtooth waveform is fixed, the resistance values of the first variable resistor R1 and the second variable resistor R2 may be controlled by the control circuit 206 to modulate the duty cycle D of the output of the comparator. If the peak value Vp of the sawtooth waveform is fixed, the control circuit 206 may adjust the value of (R1/(R1+R2)). For example, when Vp=1V and Vin=1.5V, assume that (R1/(R1+R2))=0.33, such that D=0.49 is acquired. When Vin=2V, assume that (R1/(R1+R2))=0.24, such that D=0.49 is acquired. When Vin=3V, assume that (R1/(R1+R2))=0.3, such that D=0.1 is acquired. Further values for Vin lie between 2 to 3V may be acquired similarly.

Therefore, based upon the circuit layout mentioned above, the user may further design a circuit based upon the following principle: selecting a type of a DC-DC power converter framework having the basic characteristic close to the output impedance and the output requirements of the application aspect of the adopted energy harvester. Calculating the optimal duty cycle D when the physics parameters or the output requirements of energy harvester are varied. During the duty cycle D, characteristics of the DC-DC power converter meet ranges of requirements. The input voltage Vin or the input current corresponding to the duty cycle D (the voltage or current is acquired by transforming physics parameters like light, temperature, pressure, magnetic power of the energy harvester) is processed by the comparator COMP to modulate the value of the duty cycle D. The duty cycle D is modulated to satisfy the variation of the physics parameters or result of the output requirement variation of the voltage source 200, such that the input resistance and the output characteristics of the power converter are optimized within a required range. The duty cycle is controlled by the feed forward control to control the input impedance as closed to the source impedance of the power source as possible, and then combined with the DC-DC converter circuit design to enable the output voltage and power of DC-DC converter being controlled within a certain range. The impedance changes or the requirements of output voltage and power changes of the energy may be satisfied by the easy approach.

Figure 7:
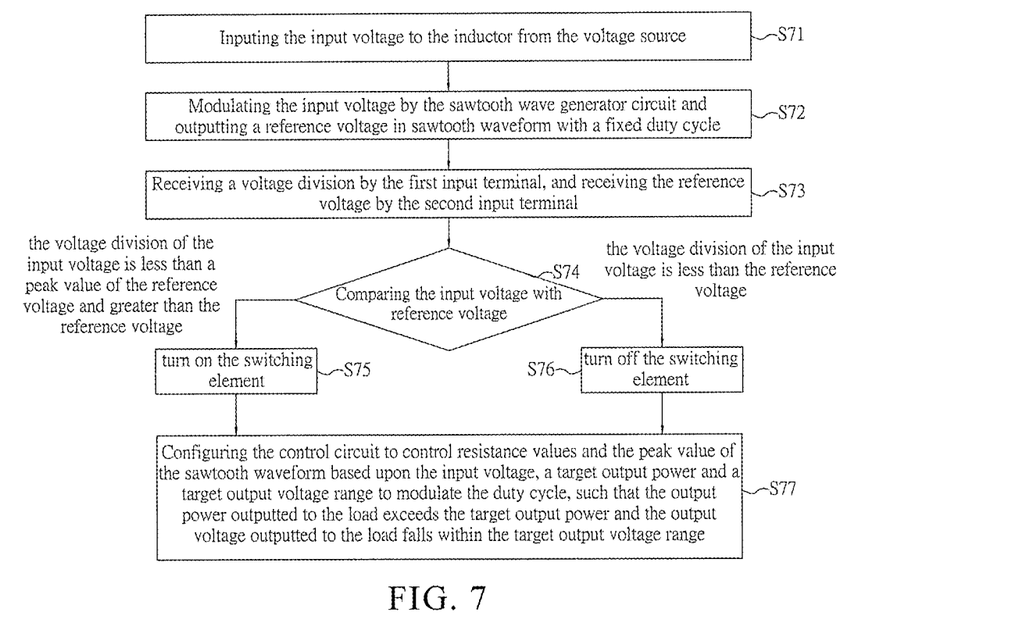
FIG. 7 illustrates a flow chart according to the embodiment of the feed forward control power method of the present invention.

Another aspect of the present application is intended to provide a method of feed forward control of power. Please refer to FIG. 7, which illustrates a flow chart according to the embodiment of the feed forward control power method of the present invention, as used between voltage and load to control output voltage output to load, also applicable to the aforementioned feed forward control power converter. The approach includes the followings steps:

Step S71: Inputting the input voltage to the inductor from the voltage source.

Step S72: Modulating the input voltage input from the power source by the sawtooth wave generator circuit and outputting a reference voltage in sawtooth waveform with a fixed period.

Step S73: Receiving a voltage division of the input voltage by the first input terminal of the comparator circuit, and receiving the reference voltage by the second input terminal of the comparator circuit.

Step S74: Comparing the input voltage with reference voltage, when the voltage division of the input voltage is less than a peak value of the reference voltage and greater than the reference voltage, enter Step S75, generating a switch controlling signal to turn on the switching element; when the voltage division of the input voltage is less than the reference voltage, enter Step S76, configuring the comparator circuit to turn off the switching elements.

Step S77: Configuring the control circuit to control resistance values of the first and second variable resistors and the peak value of the sawtooth waveform of the reference voltage based upon the input voltage, a target output power and a target output voltage range to modulate the duty cycle, such that the input impedance is as closed to the source impedance of the power source as possible, and the output power output to the load exceeds the target output power and the output voltage output to the load falls within the target output voltage range.

In summary, the feed forward control power converter of the present invention is combined with feed forward control circuits and a DC-DC converter, no required for voltage and current feedback control, therefore the structures are simple and has lower cost. By way of the aforementioned framework, the feed forward control is designed to convert the input voltage into sawtooth waveform with the fixed period, and then to be combined with the design of DC-DC converter circuit, such that the input impedance of DC-DC converter, the output voltage Vout and the output power Pout are able to be controlled within certain ranges. When the input impedance of the voltage source or current source varies, or the output voltage requirement and the output power requirement varies, the present system is designed to meet these requirements by adjusting the peak value of the sawtooth waveform with fixed period and the variable resistor coupled to the comparator circuit to modulate the duty cycle.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A quasi universal feed forward DC-DC power converter applicable to control an input impedance, an output power, an output voltage of an DC-DC converter located between a power source and a load, the quasi the universal feed forward DC-DC power converter comprising:
    an inductor coupled between the power source and the load;
    a switching element coupled to the inductor for controlling energy transmission and storage of the inductor;
    a sawtooth generator circuit modulating an input voltage of the power source and outputting a reference voltage in a sawtooth waveform with a fixed period;
    a comparator circuit having a first input terminal coupled to a junction point of two variable resistors, a second input terminal coupled to an output terminal of the sawtooth wave generator circuit, and an output terminal coupled to a control terminal of a converter switch element, wherein the first input terminal is connected to ground through a second variable resistor and receives a voltage division of the input voltage, the second input terminal receives the reference voltage, and when the voltage division of the input voltage is less than a peak value of the reference voltage and greater than the reference voltage, a switch controlling signal is generated to turn on the switching element;
    a control circuit coupled to the sawtooth wave generator circuit, the first variable resistor and the second variable resistor, respectively, the control circuit configured to control resistance values of the first and second variable resistors or to control a peak value of the sawtooth waveform of the reference voltage based upon the input voltage of the converter, a known characteristic of the power source output impedance, a target output power, and a target output voltage range, a converter duty cycle is adjusted such that the input impedance is as close to a source impedance of the power source as possible, and the output power output to the load exceeds the target output power, and the output voltage output to the load falls within the target output voltage range.

2. The quasi universal feed forward control DC-DC power converter of claim 1, further comprising a diode coupled to the switching element and the inductor, wherein when the switching element and the diode are connected between the inductor and the power source, the quasi universal feed forward control DC-DC power converter is in Buck operation mode, and when the switching element and the diode are connected between the inductor and the load, the quasi universal feed forward control DC-DC power converter is in Boost operation mode.

3. The quasi universal feed forward control DC-DC power converter of claim 1, wherein when an inductance value of the inductor is higher or lower than a threshold inductance value, the feed forward control power converter operates in continuous mode (CCM) or discontinuous mode (DCM).

4. The quasi universal feed forward control DC-DC power converter of claim 1, wherein the control circuit further calculates the target output voltage range based upon the target output power, and is configured to control the resistance values of the first and the second variable resistors, or control the peak value of the sawtooth wave form of the reference voltage based upon the input voltage, a known characteristic of the power source output impedance and the target output voltage range, such that the output voltage output to the load falls within the target output voltage range.

5. The quasi universal feed forward DC-DC power converter of claim 1, wherein when the division voltage of the input voltage is greater than the peak value of the sawtooth wave form of the reference voltage, the comparator circuit is configured to turn off the switching element for over voltage protection.

6. A quasi universal feed forward control DC-DC power converting method, which is applicable to control an input impedance, an output power, and an output voltage of a DC-DC convertor between a power source and a load, and is applicable to the quasi universal feed forward control DC-DC power converter of claim 1, the method comprising the following steps:
    inputting an input voltage to an inductor from a power source;
    modulating the input voltage input from the power source by the sawtooth wave generator circuit and outputting a reference voltage in sawtooth waveform with a fixed period;
    receiving a voltage division of the input voltage by the first input terminal of the comparator circuit, and receiving the reference voltage by the second input terminal of the comparator circuit, wherein when the voltage division of the input voltage is less than a peak value of the reference voltage and greater than the reference voltage, a switch controlling signal is generated to turn on the switching element; and configuring the control circuit to control resistance values of the first and second variable resistors or the peak value of the sawtooth waveform of the reference voltage based upon the input voltage, a known characteristic of the power source output impedance, a target output power and a target output voltage range to modulate the duty cycle of the converter , such that the input impedance is as close to the source impedance of the power source as possible, and the output power output to the load exceeds the target output power and the output voltage output to the load falls within the target output voltage range.

7. The method of claim 6, further comprising coupling a diode to the switch element and the inductor, wherein when the switching element and the diode are connected between the inductor and the power source, the quasi universal feed forward control DC-DC power converter is in Buck operation mode, and when the switching element and the diode are connected between the inductor and the load, the quasi universal feed forward control DC-DC power converter is in Boost operation mode.

8. The method of claim 6, wherein when an inductance value of the inductor is higher or lower than a threshold inductance value, the feed forward control power converter operates in continuous mode (CCM) or discontinuous mode (DCM).

9. The method of claim 6, further comprising configuring the control circuit to calculate the target output voltage range based upon the target output power, and to control the resistance values of the first and the second variable resistors and the peak value of the sawtooth waveform of the reference voltage based upon the input voltage, a known characteristic of the power source output impedance, a target output power and the target output voltage range, such that the output voltage output to the load falls within the target output voltage range.

10. The method of claim 6, wherein when the division voltage of the input voltage is smaller than the reference voltage, the comparator circuit is configured to turn off the switching element for over voltage protection.

11. The method of claim 6, wherein when the division voltage of the input voltage is greater than the peak value of the sawtooth waveform of the reference voltage, the comparator circuit is configured to turn off the switching element for over voltage protection.

* * * * *